3,206,279
LANTHANUM FLUORIDE INFRARED TRANSMITTING OPTICAL ELEMENTS
Filed Sept. 18, 1961
3 Sheets-Sheet 1
*Fig. 1*
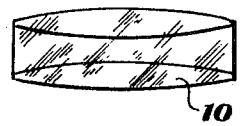
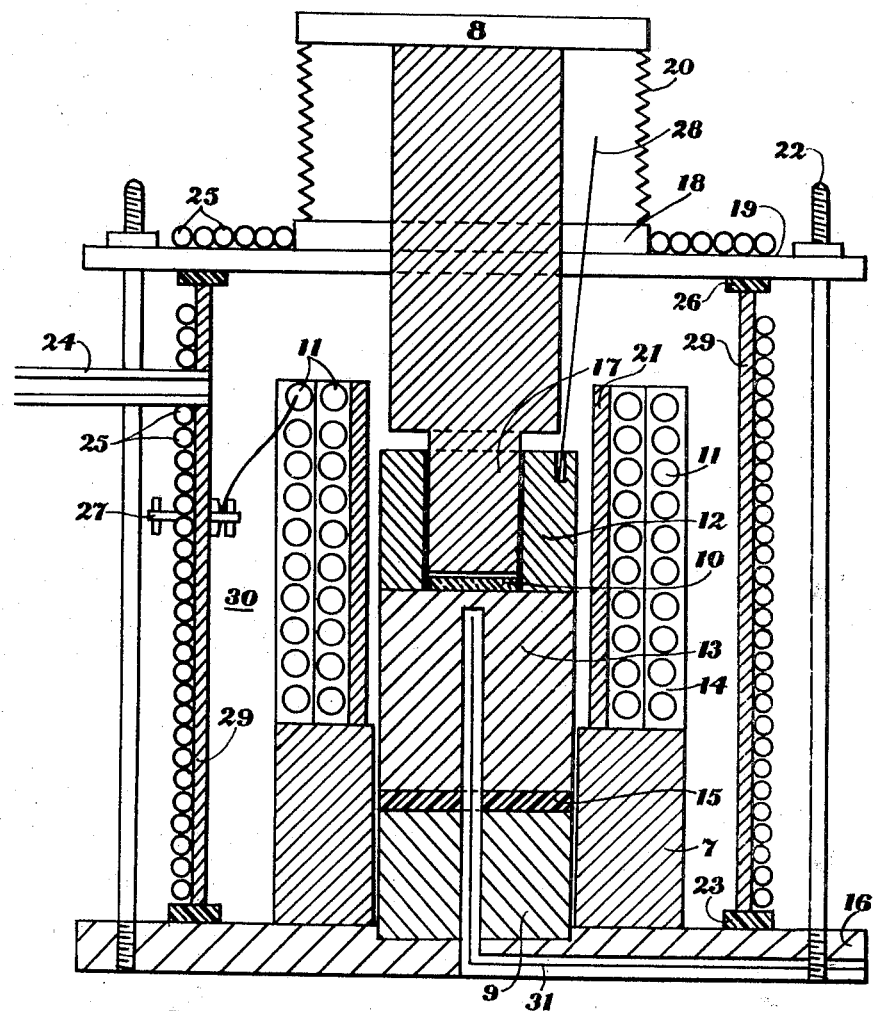
*Fig. 2*
Edward Carnall, Jr.
INVENTOR.
BY R. Frank Smith
Walter O. Hodsdon
ATTORNEYS

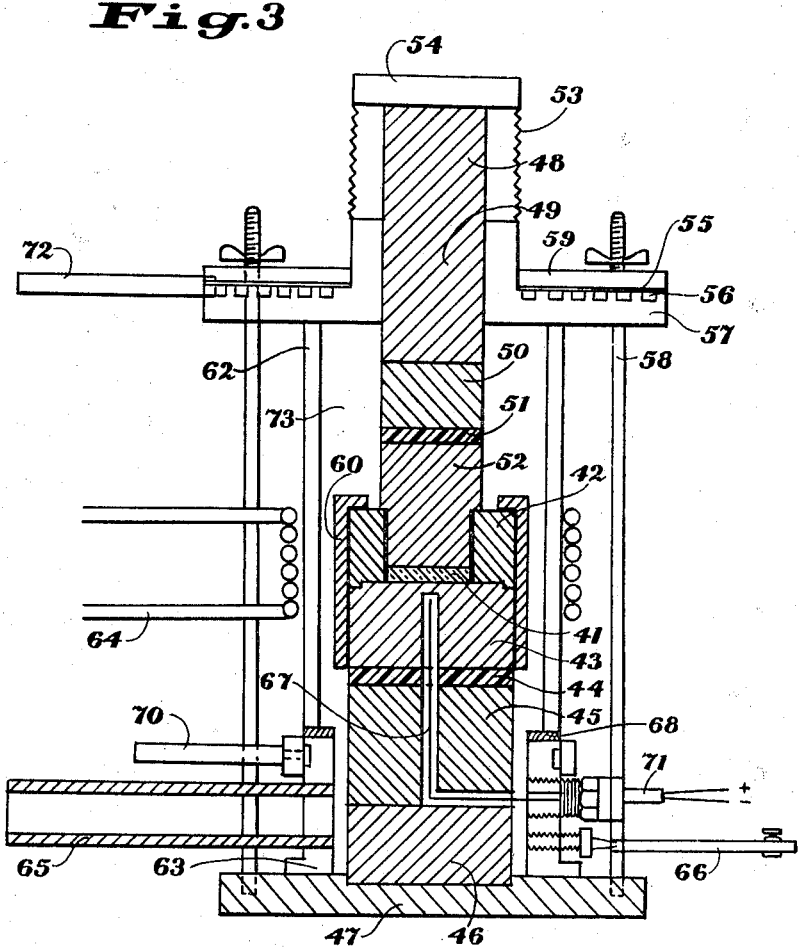

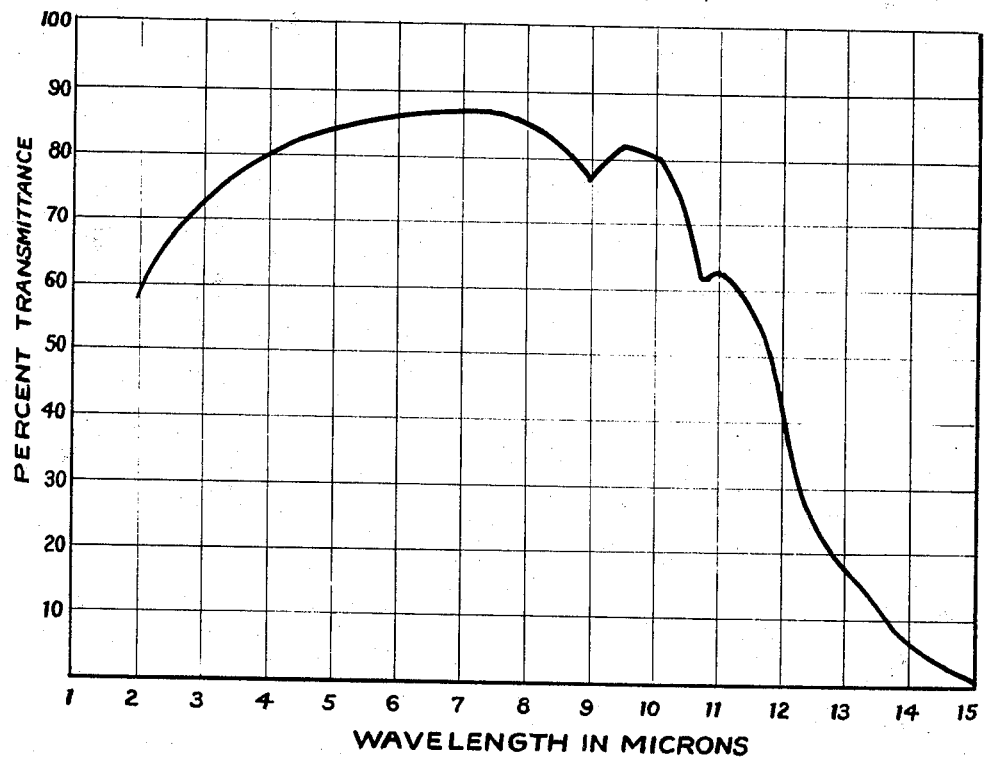

United States Patent Office 3,206,279
Patented Sept. 14, 1965

3,206,279
LANTHANUM FLUORIDE INFRARED TRANSMITTING OPTICAL ELEMENTS
Edward Carnall, Jr., Rochester, N.Y., assignor to Eastman Kodak Company, Rochester, N.Y., a corporation of New Jersey
Filed Sept. 18, 1961, Ser. No. 138,846
3 Claims. (Cl. 23—88)

This invention relates to optical elements and to methods for making optical elements. More particularly, this invention relates to methods for hot pressing transparent polycrystalline optical elements of various geometrical shapes under high pressures, temperatures and vacuum from lanthanum fluoride powder. These elements may be employed as windows in missiles and projectiles and related devices requiring such infrared refracting optics. These lanthanum fluoride windows are also useful as substrates for optical filters. Lanthanum fluoride windows produced by my process are very stable to thermal shock and temperature extremes and have desirable transmittance characteristics.

An object, therefore, of the present invention is to provide an article of manufacture consisting essentially of transparent polycrystalline lanthanum fluoride.

Another object is to provide a homogeneous solid of molded lanthanum fluoride having a density of from 99% up to and including the theoretical density.

Still another object is to provide a molded optical element which transmits in the visible and infrared regions of the electromagnetic spectrum.

Another object is to provide an infrared transmitting element which will be suitable for use in missiles, projectiles, satellites and related devices.

Yet another object is to provide a method of molding lanthanum fluoride to form such optical elements.

In accordance with a feature of this invention, lanthanum fluoride powder is hot pressed in a compression mold under conditions of high pressure, high temperature and high vacuum or inert atmosphere into a solid molded unit of transparent lanthanum fluoride. The mold may be of any suitable shape to form a window or a lens of desired contour.

The invention will be further understood by reference to the following detailed description and drawings in which:

FIG. 1 is a view of a transparent polycrystalline solid molded from lanthanum fluoride powder;

FIG. 2 is an elevational view partly in section of a compression molding device for molding lanthanum fluoride powder in accordance with this invention;

FIG. 3 is an elevational view partly in section of a compression molding device which employs high frequency heating for molding lanthanum fluoride powder into optical units.

FIG. 4 is a graph showing the specular transmittance in the infrared region of transparent polycrystalline lanthanum fluoride prepared in accordance with the present invention.

The molding apparatus shown in FIG. 2 comprises a base 16, a silicone gasket 23, a block 9, a thermal insulator 15, a block 13, a molding cylinder 12, a molding plunger 17, having a head 8 which is adapted to be attached to a prime mover, not shown, such as the piston of a hydraulic press to move the plunger 17 vertically into and out of molding cylinder 12 and thereby press the lanthanum fluoride powder into the solid unit shown at 10.

The head 8 is attached to aligning ring 18 by metal bellows 20 thereby assuring a vacuum seal around the upper portion of the plunger 17.

A cylinder 21 encloses the molding cylinder 12 and lower portion of the plunger 17 and is supported on block 7. A heating unit 14 comprising a refractory casing is positioned around cylinder 21 and is also supported on block 7 and contains electric heating coils 11, the terminals for which are shown at 27.

A cylinder 29 is positioned concentrically in respect to cylinder 21 and forms a vacuum chamber 30, the ends of which are closed by gaskets 23 and 26 and plates 16 and 19. Cooling coils 25 are positioned in contact with the outer surface of cylinder 29. A conduit 24 connects the vacuum chamber 30 to a suitable vacuum system not shown. The assembly is further secured by the coaction of top plate 19 and threaded rods 22 and base plate 16.

The temperature is measured by either one or by both thermocouples 28 and 31 which are suitably located in channels respectively positioned adjacent the molding position.

The blocks 9 and 13 and cylinder 12 and plunger 17 may be made of molybdenum, molybdenum alloy, Nichrome or stainless steel.

A satisfactory hot pressed, transparent polycrystalline lanthanum fluoride window may be made employing the apparatus shown in FIG. 2 as follows:

Lanthanum fluoride powder is introduced into the cavity of cylinder 12 beneath plunger 17. Chamber 30 is evacuated through pipe 24. Next, cooling water is circulated through the cooling coils 25 and also through the platens, not shown, of the hydraulic press, and then electric current is supplied to the heater coils 11 through terminals 27. The temperature of the mold is monitored by means of platinum-rhodium thermocouples 28 and 31. When the temperature of thermocouple 28 reaches 850° C., force is applied to the head 8 of plunger 17 by the hydraulic press, not shown, and the pressure is raised on the lanthanum fluoride powder to approximately 40,000 p.s.i. This pressure is maintained on the lanthanum fluoride for from 20 to 30 minutes while the temperature is held at 825–875° C. At the end of the pressing period, the power is shut off and the pressure is released slowly. The vacuum pump is shut off and argon, or other inert gas, is bled into chamber 30. The assembly is allowed to cool to about 200° C. as recorded by the thermocouples.

The plunger 17 is now withdrawn from the cylinder 12 and the piece of polycrystalline transparent lanthanum fluoride 10 is permitted to cool to approximately room temperature and is removed from the apparatus and employed as desired.

Referring to FIG. 3, an elevational view, partly in section, of another modification of the molding apparatus is shown. This modification employs high frequency heating. In general, however, the parts of the apparatus are similar in kind and operation to that shown in FIG. 2.

The pressed lanthanum fluoride powder is shown at 41. The apparatus comprises molding cylinder 42, molding block 43, insulator 44 and supporting blocks 45 and 46. Block 46 rests on base 47. A graphite sleeve 60 is positioned between induction heating coils 64 and members 42 and 43. Also positioned on base 47 is a cylindrical chamber 63 through which vacuum conduit 65, a vacuum release conduit 66 and a thermocouple conduit 71 extend. A water pipe 70 connects the chamber 63 to a water supply, not shown. The thermocouple is shown at 67. A quartz cylinder 62 is positioned on member 63 and separated therefrom by a gasket 68. Cylinders 62 and 63 thus form a vacuum chamber 73, the upper portion of which is closed by plate 57 having water cooling channels 56 therein. Cooling water is supplied through conduit 72 to channels 56, a gasket 55 forms the upper surface of the channels 56 and is held in position by clamping plate 59. The assembly is clamped by a plurality of clamping rods 58 and cooperating wing nuts.

The molding plunger 48 extends through an aligning aperture in plate 57. Freedom of motion of the plunger and a vacuum seal are achieved by means of the metal bellows 53, the ends of which are sealed respectively to the head 54 of the plunger 48 and to plate 57.

The molding plunger 48 comprises three sections. Section 49 is preferably made of stainless steel, section 50 of Nichrome and section 52 of molybdenum. An insulator 51 is positioned between sections 50 and 52.

In the apparatus of FIG. 3, the cylinder 42, plunger 48 and block 43 may advantageously be made of a material which will couple the high frequency field. Thus, a metal which couples efficiently rather than an inefficient metallic coupler or a dielectric material is desirable for these parts. The top and bottom plates 57 and 59 and the base plate 47 may be of aluminum. Cylinder 42, block 43 and plunger 52 preferably are of molybdenum and block 45 of Nichrome and 46 of Nichrome or stainless steel. The insulators 44 and 51 are of Transite. The apparatus of FIG. 3 is operated at substantially the same schedule of temperature, pressure and vacuum as described above, but due to the high frequency heating, the heating cycle can be reduced to approximately a ten-minute period, the first five minutes of which is a heat-up period.

However, it is sometimes desirable to use molybdenum for parts 42, 43 and 52 and since molybdenum does not couple the high frequency field efficiently, a graphite sleeve 60 which fits snugly over the molding cylinder may be employed. The high frequency field couples and heats the graphite which in turn heats the molding cylinder by thermal conduction.

Induction heating is also advantageous in that inert atmospheres can be used more readily than with resistance heating. When employing a molding cylinder which efficiently couples the high frequency field, the graphite shield need not be used.

The above described hot pressing operations give optimum results. However, satisfactory transparent polycrystalline lanthanum fluoride windows have been produced at temperatures varying from 825° C. to 875° C.

Pressures have been varied from about 36,000 p.s.i. to 45,000 p.s.i. Pressures less than 36,000 p.s.i. may result in a window that is not completely pressed to a homogeneous mass. Any pressure in excess of the optimum 45,000 p.s.i. does not seem to contribute to the quality of the window.

The time at pressing temperature has been varied within the limits of about 10 to 40 minutes. At times less than five minutes, the window may not be pressed out.

Limits are imposed on hot pressing by the available mold materials. The plunger, molding cylinder and supporting block must all be strong at high temperatures and must be inert to lanthanum fluoride. An alloy made of molybdenum and titanium may be used for pressing lanthanum fluoride.

Lanthanum fluoride of high purity gives much better results than that of lower purity. (Sub-micron powder size is most desirable for good results.)

A major problem in the hot-pressing work is the unwanted bonding between the lanthanum fluoride and mold parts. Some cracking of lanthanum fluoride windows has occurred because of bonding to the molybdenum mold parts. It has been found effective to cover the parts of the mold contacting the lanthanum fluoride with a light coat of graphite. This prevents sticking and cracking. It may also be helpful to line the mold cavity with a thin foil of a material such as tungsten.

Lanthanum fluoride windows may be sealed into metal rings to provide infrared transmitting windows hermetically sealed to the metal. The metal may be used as a mounting surface.

*Properties*

| | |
|---|---|
| Color | Water white. |
| I.R. transmission | Transmits to 13-14 microns. |
| Index of refraction | 1.55 at 7 microns. |
| Reflection loss | About 10%. |
| Hardness | Unknown. |
| Thermal shock | |
| High temperature resistance | |
| Coefficient of expansion | |
| Solubility | Insoluble in water. |
| Workability, i.e., grinding and polishing | Like glass. |
| Thermal conductivity | |

Lanthanum fluoride powder may be pressed in accordance with this invention in various geometrical shapes and sizes. Cylindrical pieces varying in diameter have been pressed. Lenses may be pressed in carefully polished molds with accurate radius of curvature and the resulting pressing will have a finished optical surface within close tolerance. However, lenses may be also optically polished in the usual manner. The size and shapes of hot pressed lanthanum fluoride pieces is not limited except by available apparatus and large diameter intricately-shaped pieces may be formed. Lanthanum fluoride lenses may be made in clusters.

In addition to the use of polycrystalline lanthanum fluoride windows in missiles, and other devices, many other uses are envisioned for this hot pressed material. Spherical domes, lenses, prisms and other optical shapes may be made. Also, it may be sealed into metal rings to provide infrared transmitting windows hermetically sealed into the metal ring. The metal may in turn be used as a mounting surface.

I claim:

1. A hot-pressed article of manufacure consisting of lanthanum fluoride in the form of a solid unitary homogeneously polycrystalline substance.

2. A hot-pressed article of manufacture consisting of homogeneously polycrystalline lanthanum fluoride in the form of a unitary solid which is transparent in the visible and infrared region of the electromagnetic spectrum.

3. The hot-pressed article of manufacture consisting of homogeneously polycrystalline lanthanum fluoride in the form of an infrared transparent unitary solid having a density in the range of 99 percent up to and including theoretical density.

References Cited by the Examiner

UNITED STATES PATENTS

| 2,091,569 | 8/37 | Ridgway et al. | 25—156 |
| 2,303,783 | 12/42 | Adamoli | 23—88 |
| 2,335,325 | 11/43 | Wainer | 25—156 |
| 2,420,955 | 5/47 | Kremers et al. | 88—57 |
| 2,511,224 | 6/50 | Sun et al. | 88—57 |
| 2,592,113 | 4/52 | Brodal et al. | 23—88 |

OTHER REFERENCES

Ryason: Journal of Optical Society of America, vol. 43, p. 928 (October 1953).

MAURICE A. BRINDISI, *Primary Examiner.*

GEORGE D. MITCHELL, *Examiner.*